Feb. 4, 1930.  C. P. COX  1,746,072
KITCHEN UTENSIL
Filed April 12, 1928
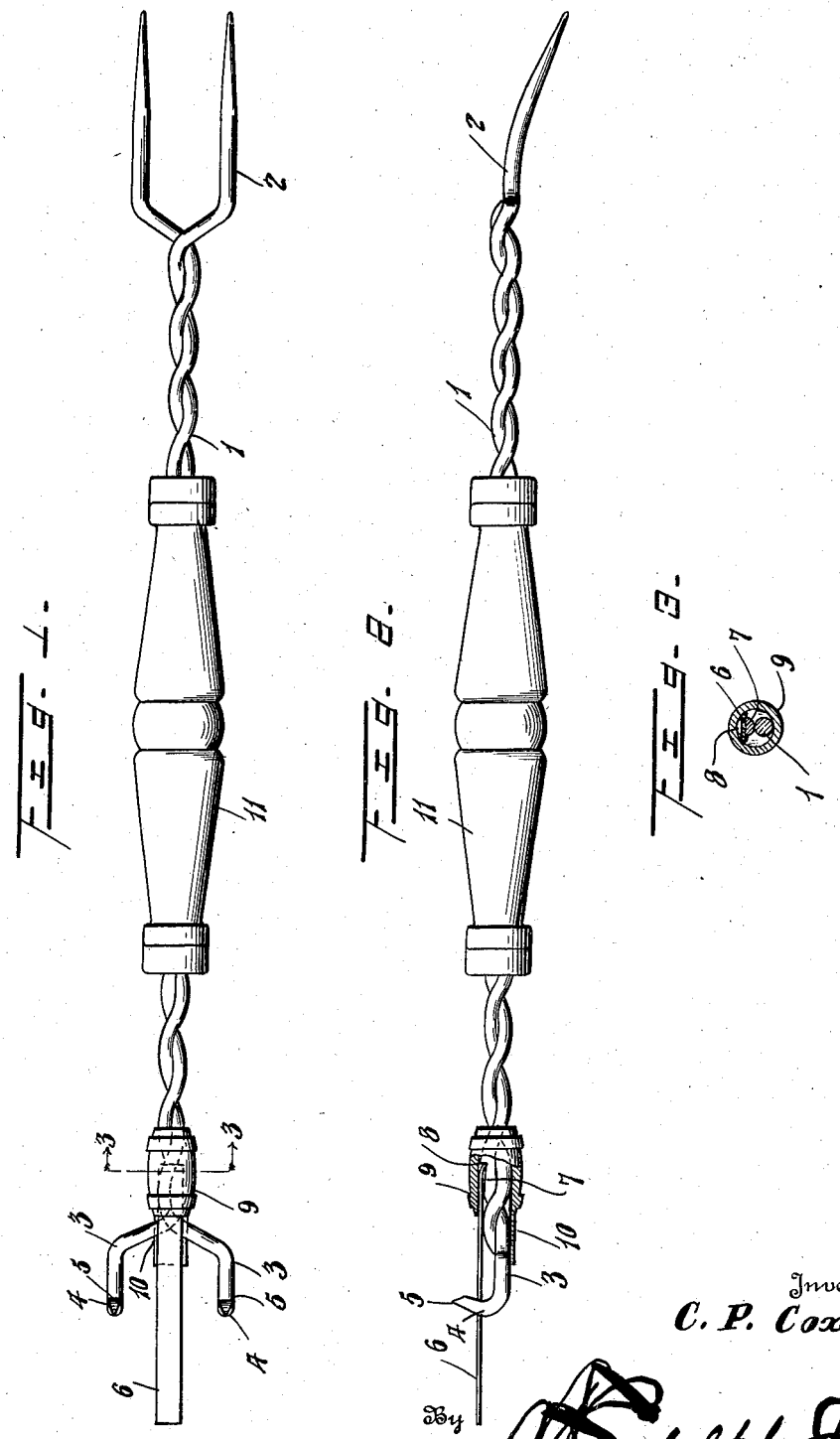
Inventor
C. P. Cox.

Patented Feb. 4, 1930

1,746,072

UNITED STATES PATENT OFFICE

CHARLES P. COX, OF TOLEDO, OHIO

KITCHEN UTENSIL

Application filed April 12, 1928. Serial No. 269,564.

The invention relates to an implement particularly adapted for use in the kitchen and comprises an implement of the fork type that is preferably double ended and provided with a fork at one end and a tool at the other designed to be used for handling hot pie pans, pots, etc., the implement having a wooden or other heat insulating handle intermediate of its ends to enable using either end of the implement.

A further object of the invention is the provision of a kitchen utensil of the type stated formed of two bars or lengths of heavy wire twisted on one another intermediate of the ends of the bars to form a shank, the ends of the bars being spread and forming a two tined fork on one end of the shank, while the spread ends of the bar at the other end of the shank have their extremities bent at an angle to the spread ends and tapered to engage under the beaded edge of a pot or pan, and a spring tongue secured to the shank and extending between the bent ends to engage a pot or pan to hold the bent ends in engagement with the beaded edge.

A further object of the invention is the provision in an implement of the type hereinbefore described, including a shank, spaced ends of the shank with the extremities bent at an angle thereto and tapered, and a spring tongue to cooperate with said bent end for lifting pots and pans, the notch formed in the shank to receive the end of the tongue secured thereto including a shoulder for abutting the end of the spring tongue, of a band secured around the shank to fasten the tongue in engagement therewith, and having a projection extending in the direction of the tongue and on opposite sides therefrom to reinforce the spring tongue when flexed in engagement with the pot or pan.

The invention will be described in detail hereinafter and will be found illustrated in the accompanying drawings, in which Figure 1 is a plan view of the improved utensil, Figure 2 is a side view partly in section, and Figure 3 is a transverse sectional view on a plane indicated by the line 3—3 of Figure 1.

In the drawings similar reference characters are used to designate corresponding parts throughout the several views.

The improved kitchen utensil or implement is made preferably of two bars of suitable material, such for instance as steel, said bars may be of a heavy gage wire, and twisted intermediate of their ends on one another, to form a shank 1. The free ends of the bars at one of the ends of the shank are spread and extended parallel to one another and slightly curved as shown to form tines of a fork, as shown at 2, the ends of the bars forming the tines of the fork being tapered to a point as shown. The ends of the bars at the other end of the shank are also spread as shown at 3 and have their extremities bent at an angle to the spread ends 3 as shown at 4 and tapered to edges as shown at 5, said edges being alined with one another. A spring tongue 6 is secured at one of its ends to the shank 1 and having its free end extended between the ends 3 and the bent extremities 4, said spring tongue being designated 6. The end of the tongue 6 engaging the shank 1 is seated in a notch 7 formed in one of the bars comprising the shank 1 and the secured end of the tongue abuts the shoulder 8 that is formed by said notch. 9 indicates a band of suitable material that is secured around the shank 1 and the secured end of the tongue 6 to securely hold the tongue 6 in place on the shank, and said band 9 is provided with a projection 10 positioned on the opposite side of the shank of the tongue and extending in the same direction therewith and adapted to reinforce the spring tongue when it is flexed into engagement with a pot or pan for lifting or otherwise handling it. A handle 11 of wood or other heat insulating material is secured on the shank intermediate of its ends.

The utility of the forked end 2 of the implement will be apparent and a description thereof is considered to be unnecessary. Regarding the other end of the implement, comprising the spaced ends 3 and the upturned ends 4 with their sharpened edges 5, coacting with the spring tongue 6, this end of the implement has many uses including the handling of hot pots or pans it being understood that for lifting or shifting pots and pans on the stove the spring tongue 6 is pressed against the pot or pan until the sharpened edges 5 of the upturned ends 4 engage under the bead around the edge of the pot or pan and that it would be readily understood that the implement forms a handle for lifting or shifting the pot or pan. This end of the implement may also be used for handling empty pie pans and for pulling heavy bake pans from an oven by engaging the tongue 6 with the top of the pan and then pressing the bent ends 4 downwardly under the edge of the pan and thus enable the operator to securely engage the pan for lifting or shifting it. Furthermore the device may be used as a lid lifter by engaging the spring tongue under the ring or handle on the lid.

What is claimed is:—

1. A kitchen utensil, comprising a shank, forked ends on said shank, the extremities of said forked ends bent at an angle thereto, a spring tongue secured to the shank and extending between said forked ends, and means associated with the tongue securing means to reinforce the spring tongue when flexed.

2. A kitchen utensil, comprising a shank, forked ends on said shank, the extremities of said forked ends bent at an angle thereto, a spring tongue secured to the shank and extending between said forked ends, and means associated with the tongue securing means and extending in the direction of the tongue and on the opposite side of the shank therefrom to reinforce the spring tongue when flexed.

3. A kitchen utensil, comprising a shank, forked ends on said shank, the extremities of said forked ends bent at an angle thereto, a spring tongue secured to the shank and extending between said forked ends, the shank provided with a notch to receive an end of the tongue and including a shoulder abutting the tongue end, means to secure the tongue in engagement with the shank, and a projection on said means extending in the direction of the tongue and on the opposite side of the shank therefrom to reinforce the tongue when flexed.

4. A kitchen utensil, comprising two bars twisted on each other intermediate of their ends to form a shank, a handle of heat insulating material secured to said shank, the ends of the bars at the two ends of the shank being spread, the ends of the rods at one end of the shank forming a double-tined fork, the ends of the rods at the opposite end of the shank bent at an angle to the axis of the shank, and a spring tongue member secured to the shank and extending between said bent ends of the rods.

5. A kitchen utensil, comprising a shank, forked ends on said shank, the extremities of said forked ends bent at an angle thereto, a spring tongue engaging the shank and extending between said forked ends, the shank having a notch to receive an end of said spring tongue and providing a shoulder abutting said tongue end, a band enclosing the shank and tongue end, and a projection on the band extending in the direction of the free end of the tongue and on the opposite side of the shank to reinforce it.

In testimony whereof I affix my signature.

CHARLES P. COX.